US008505201B2

(12) United States Patent
DeMichael et al.

(10) Patent No.: US 8,505,201 B2
(45) Date of Patent: Aug. 13, 2013

(54) REPAIR OF COATED TURBINE VANES INSTALLED IN MODULE

(75) Inventors: Thomas DeMichael, Stafford Springs, CT (US); Richard Gerst, Bristol, CT (US); Brian S. Tryon, Glastonbury, CT (US); David A. Rutz, Glastonbury, CT (US); Billie W. Bunting, Colchester, CT (US)

(73) Assignee: United Technologies Corporation, Hartford, CT (US)

( * ) Notice: Subject to any disclaimer, the term of this patent is extended or adjusted under 35 U.S.C. 154(b) by 6 days.

(21) Appl. No.: 13/184,908

(22) Filed: Jul. 18, 2011

(65) Prior Publication Data

US 2013/0019473 A1 Jan. 24, 2013

(51) Int. Cl.
*B23P 6/00* (2006.01)

(52) U.S. Cl.
USPC .................... 29/889.1; 29/402.07; 29/402.11; 29/402.18

(58) Field of Classification Search
USPC ................... 29/889.1, 889.21, 889.7, 889.72, 29/402.03, 402.04, 402.06, 402.07, 402.09, 29/402.11, 402.18
See application file for complete search history.

(56) References Cited

U.S. PATENT DOCUMENTS

| | | | |
|---|---|---|---|
| 6,010,746 A | 1/2000 | Descoteaux et al. | |
| 6,440,499 B1 * | 8/2002 | Wydra et al. | 427/376.8 |
| 6,993,811 B2 * | 2/2006 | Das et al. | 29/23.51 |
| 2007/0122647 A1 * | 5/2007 | Russo et al. | 428/651 |

* cited by examiner

*Primary Examiner* — David Bryant
*Assistant Examiner* — Ryan J Walters
(74) *Attorney, Agent, or Firm* — Kinney & Lange, P.A.

(57) ABSTRACT

A method of repairing a damaged coated vane from a turbine module without removing the vane from the module is taught. The method includes locally removing the coating in the vicinity of the damage as well as any underlying damage in the superalloy substrate. A diffusible coating precursor is then applied to the damage site. A heat treating fixture is then mounted on the vane and repair site is heated to up to 2000° F. in an inert environment to interdiffuse the coating precursor and the substrate. After the diffusion anneal, the vane is cleaned and the module is returned to service.

18 Claims, 6 Drawing Sheets

REPAIR OF COATED TURBINE VANES INSTALLED IN MODULE

BACKGROUND

Gas turbine engines contain a number of turbine modules each containing a plurality of vanes and blades for exchanging energy with a working fluid medium. Since the vanes and blades of a turbine module operate in a high temperature gas stream, they are typically constructed of high temperature nickel-based, cobalt-based, or iron-based superalloys. They are further coated with oxidation and corrosion resistant coatings. Preferred coatings are aluminide and MCrAlY coatings where M is nickel, cobalt, iron, or mixtures thereof. Aluminide coatings are compounds that contain aluminum and usually one other more electropositive element such as cobalt or platinum. When the coatings are applied to the parent superalloys, a diffusion layer is formed beneath the aluminide coating layer that is oxidation resistant.

In engine run turbine modules, it is sometimes necessary to remove selected areas of vane and blade surfaces in order to restore various features of the surfaces to their original condition. If this restoration can be performed in situ without disassembling a module, considerable time and money is saved.

SUMMARY

A method of repairing a damaged turbine engine component of a module assembly includes steps performed with the component mounted in the module assembly. A damaged coating and underlying physical damage to the component are removed to prepare the repair site. A diffusible coating precursor is applied to the repair site. A heating fixture is mounted on the component and repair site to interdiffuse the coating precursor and the component. Following interdiffusion, the component is cleaned, and the module can then be returned to service.

DETAILED DESCRIPTION

Figure 1:
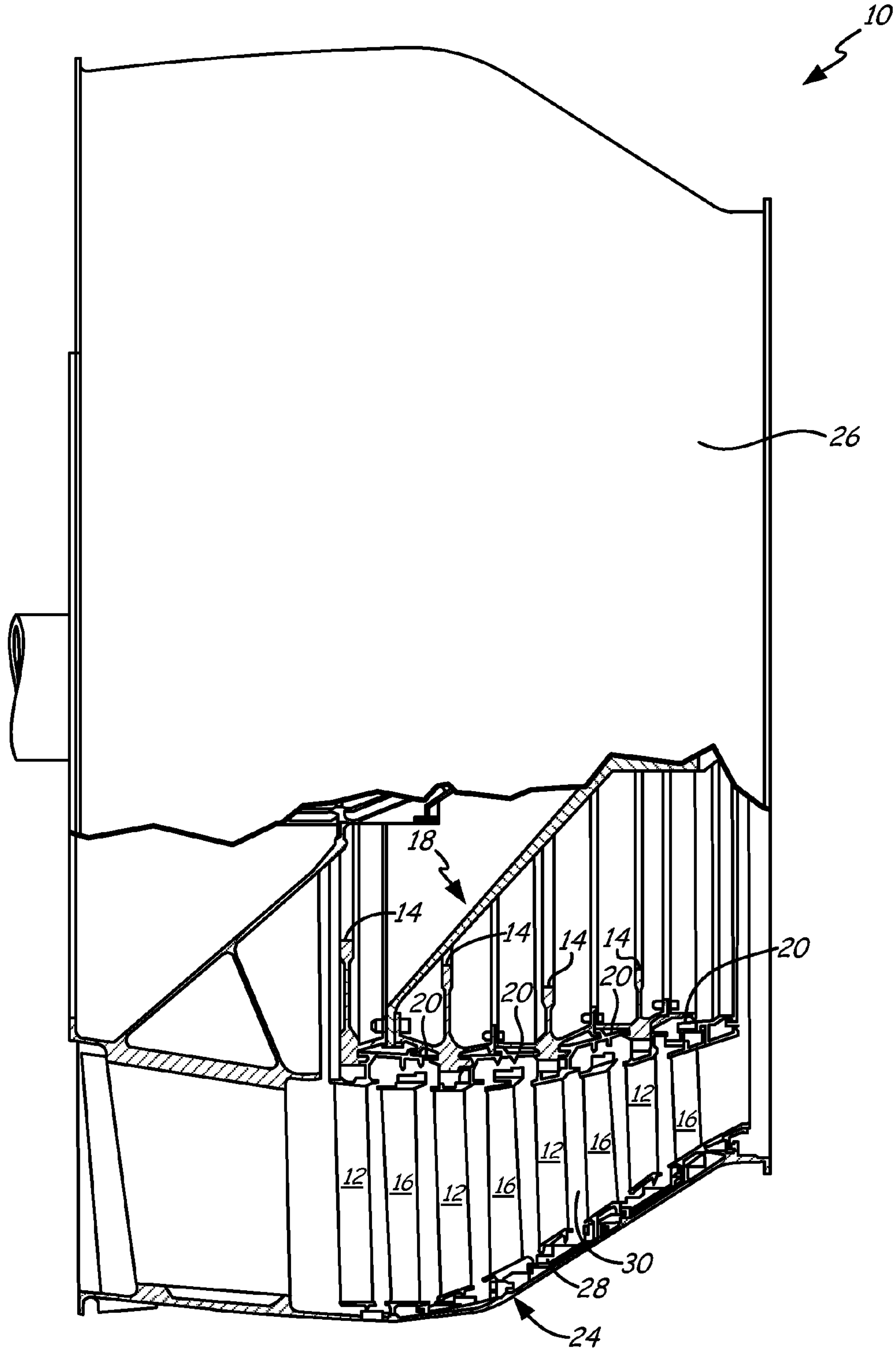
FIG. 1 is a schematic cross sectional side view of a turbine module of a gas turbine engine.

Turbine module 10 for a gas turbine engine is shown in FIG. 1. Module 10 contains one or more arrays of circumferentially distributed blades 12 that extend radially from hubs 14 and one or more stages of circumferentially distributed stator vanes 16 axially offset from the blades. The blades and vanes, which may be generically referred to as "fluid reaction elements" are made of a substrate material comprising high temperature nickel-based, cobalt-based, iron-based superalloys or mixtures thereof. Protective coatings are applied to the substrate to protect it from oxidation, corrosion, and thermal damage. One widely used class of coatings is the class of aluminide coatings. Aluminide coatings are compounds that contain aluminum and usually one other more electropositive element such as cobalt or platinum. When the coatings are applied to the parent superalloy, and thermally treated at temperatures of 1500° F. to 2000° F., an aluminum rich diffusion layer forms beneath the aluminide coating that is oxidation resistant by forming aluminum oxide in service. Another widely used class of coatings is the class of MCrAlY coatings wherein M is nickel, cobalt, iron, or mixtures thereof. For blades and vanes that operate at particularly high temperatures, the protective coatings may also include a ceramic thermal barrier layer that overlays the metallic aluminide or MCrAlY layer.

A schematic cross sectional side view of turbine module 10 of a gas turbine engine is shown in FIG. 1. Turbine module 10 includes inner drum 18 having inner air seal rings 20 that extend axially between adjacent hubs 14. Module 10 also includes an outer case assembly 24 having case 26 with one or more outer air seal rings 28 affixed thereto outboard of each blade array. Blades 12 and vanes 16 extend across annulus 30 between the case assembly 24 and drum 18.

Figure 2:
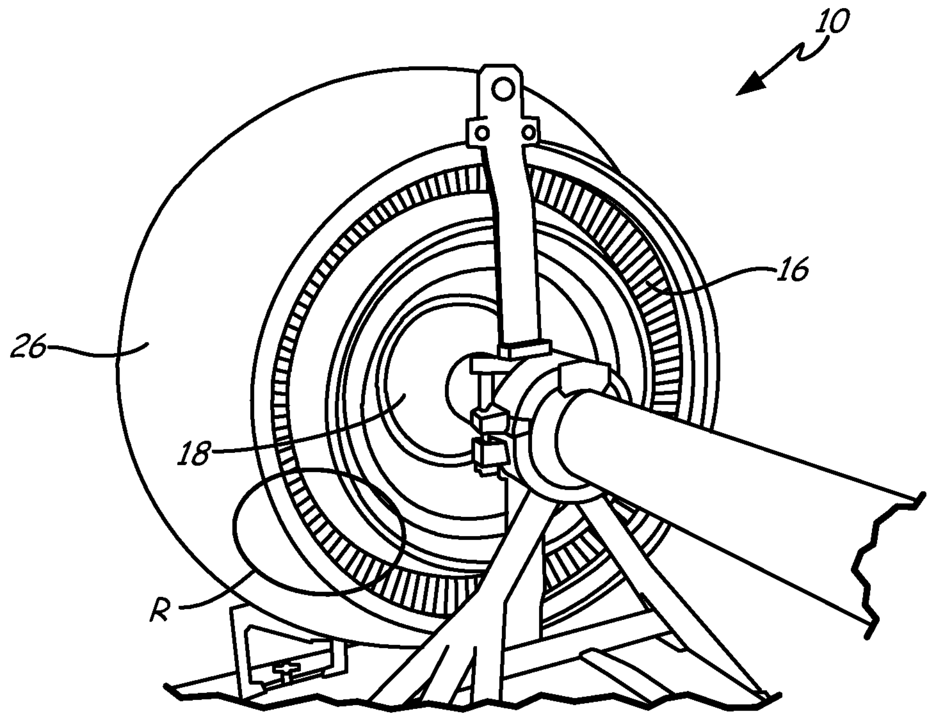
FIG. 2 is a perspective view of a module similar to that of FIG. 1 showing the intake surface downstream from a combustor.

A perspective view of turbine module 10 is shown in FIG. 2. Case 26 and inner drum 18 are as indicated. Vanes 16 are seen to be readily accessible for inspection and in situ repair without further disassembly of module 10.

Figure 3:
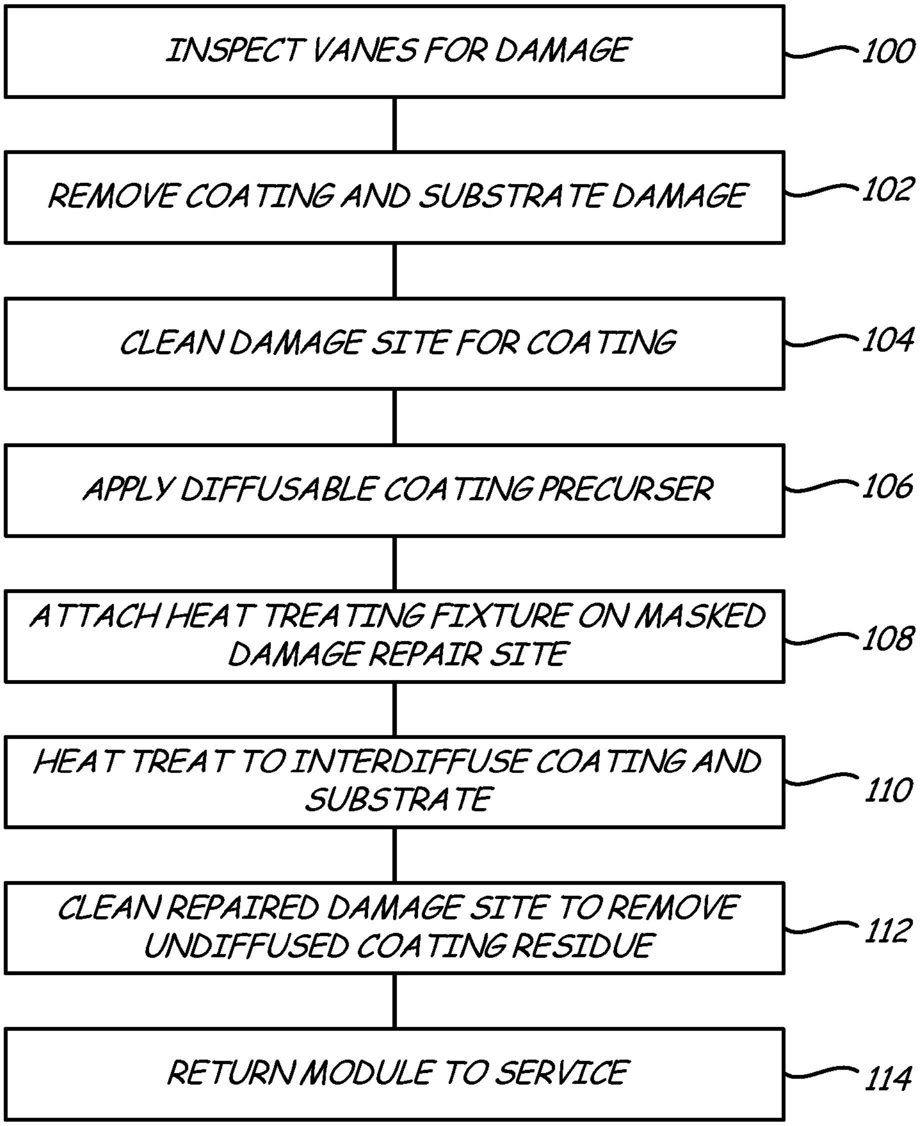
FIG. 3 is a diagram of a repair process for damaged vanes in a turbine module.

The inspection and repair procedures according to this invention are diagramed in FIG. 3. Following inspection, damaged vanes are marked and recorded (Step 100). Damaged regions are then prepared for repair by removing the coating in the vicinity of the damage preferably by mechanical abrasion.

After the coating is removed, the substrate is inspected for subsurface damage such as cracks. If the cracks are determined to be deep and removal would endanger the integrity of the hollow vane, disassembly of the module would then be called for in order to complete repair. If the cracks are determined to be repairable, material around the crack is removed by abrasive techniques until the crack is removed and the surface blended (Step 102). The damaged site is then cleaned in preparation for reapplication of protective coatings (Step 104).

A diffusible protective coating is then reapplied to the cleaned repair site (Step 106). Diffusible coatings on vanes are preferably aluminide coatings or MCrAlY coatings wherein M is nickel, cobalt, iron, or mixtures thereof. Diffusible coatings can be applied as coating precursors in slurry or tape form. Coatings can also be applied by thermal spraying, physical vapor deposition, or pack aluminiding. For in situ repair of localized damage to, for instance, vanes 16 on turbine module 10, slurry or tape application of protective coatings is preferred.

In the embodiment of FIG. 3, an aluminide coating is preferred. Even more preferred is a low activity aluminide coating comprising about 43 wt. % to about 47 wt. % cobalt powder and the remainder aluminum powder fluorinated by an addition of LiF. In slurry form, the diffusible aluminide precursor is either applied by brush or spray. In tape form, the precursor is applied and mechanically connected to the repair surface to ensure interdiffusion during the subsequent interdiffusion anneal.

In preparation for an interdiffusion anneal, a heat treating fixture is attached to the vane containing the repair site (Step 108). The heat treating fixture preferably contains at least two high energy infrared quartz lamps with reflectors that focus the energy on the repair site such that adjacent components are not affected by the thermal energy. The heat treating fixture also provides an inert environment to the repair site during the interdiffusion anneal. It is important that the repair site be completely surrounded by an inert atmosphere during the interdiffusion anneal. An optical pyrometer provides thermal monitoring to a control system such that the temperature history during the interdiffusion is carefully controlled.

After the heat treating fixture is attached to the vane containing the repair site, the site is heated to about 1600° F. for between 1-10 hours to interdiffuse the coating and the substrate (Step 110).

Following the interdiffusion anneal, the heat treating fixture is removed and the repair site is cleaned (Step 112). Following a final inspection, the repaired turbine module is returned to service. (Step 114).

Figure 4:
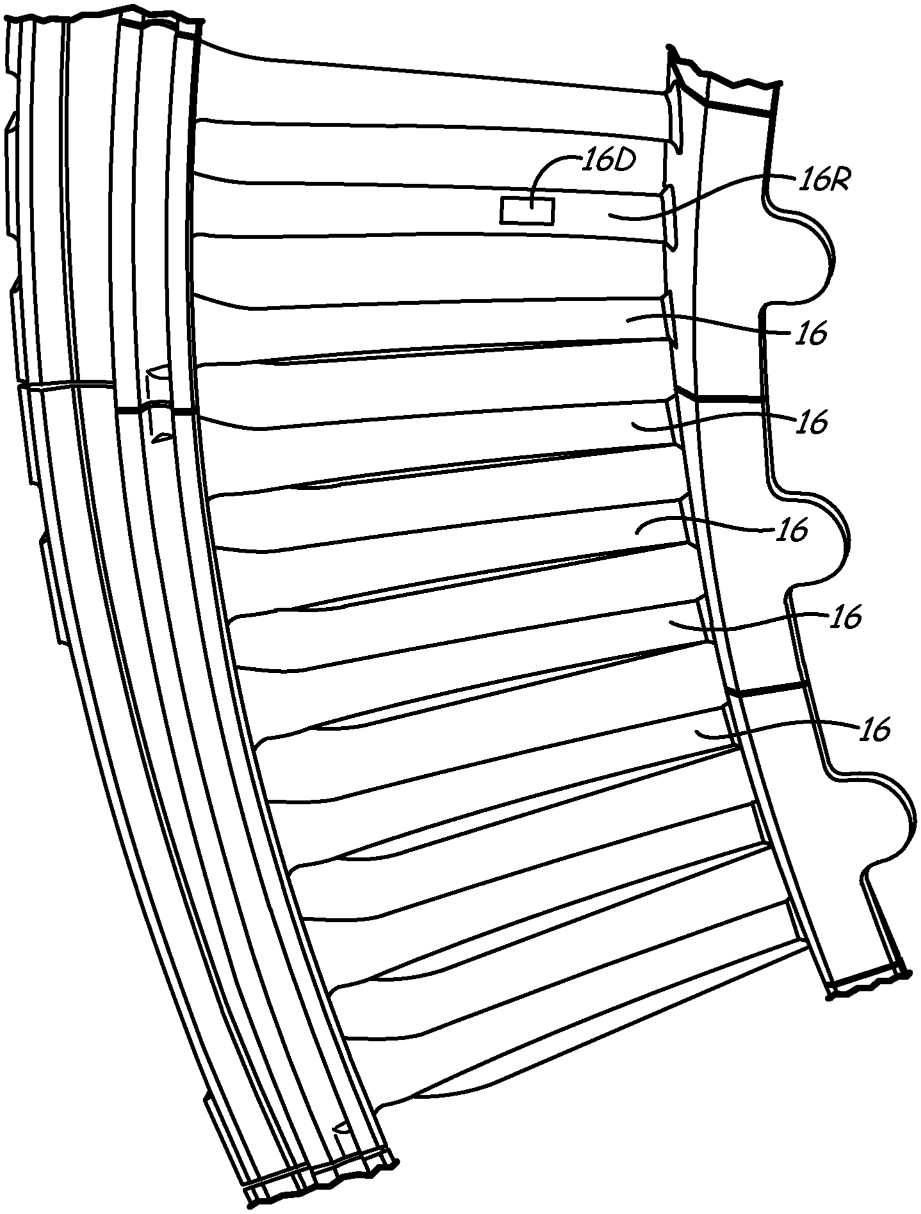
FIG. 4 is a perspective enlarged view of vanes showing diffusion aluminide precursor applied to a repair region.
Figure 5:
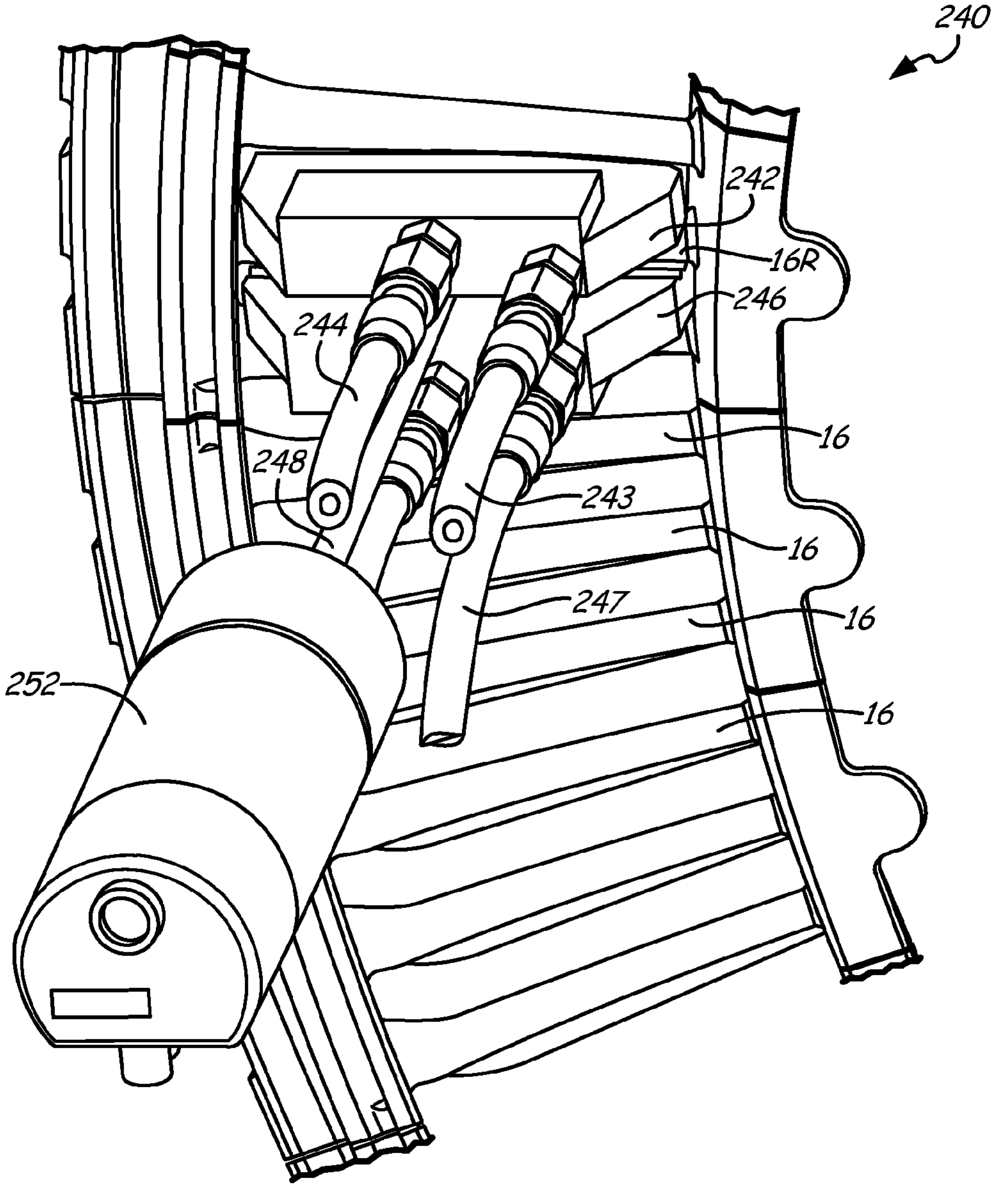
FIG. 5 is a view of FIG. 4 with a heat treating fixture attached to a damaged vane.

An enlarged view of region R of turbine module 10 of FIG. 2 is shown in FIG. 4 showing damaged vane 16R and damage site 16D that has been prepared for repair by removing the protective coating and underlying damage and by applying a diffusible coating precursor thereon. As shown in FIG. 5, in preparation for the interdiffusion anneal, heat treating fixture 240, is attached to the damaged vane in the vicinity of the coated repair site.

Heat treating fixture 240 comprises focused quartz lamp fixtures 242 and 246 on damaged vane 16R. Heat treating fixture 240 further comprises fluid cooling lines 243 and 244 to focused quartz lamp fixture 242 and fluid cooling lines 247 and 248 to focused quartz lamp fixture 246. Optical pyrometer 252 monitors temperature of damage repair site 16D during the interdiffusion anneal.

Figure 6:
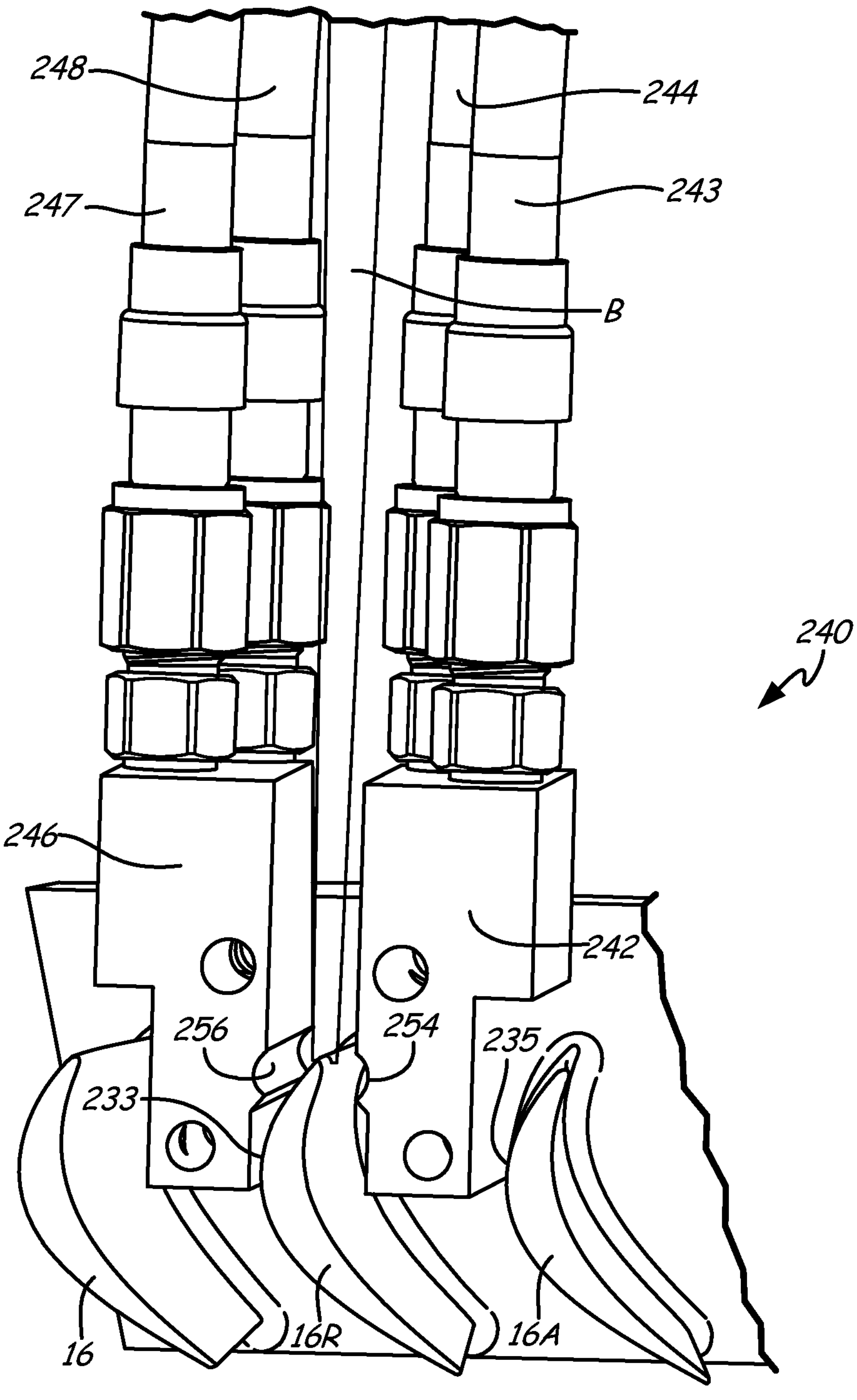
FIG. 6 is a different view of FIG. 5 showing the focused heat treating assembly.

A detailed view showing the position of focused quartz lamp fixtures 242 and 246 in relation to damaged blade 16R is shown in FIG. 6. Quartz lamp fixture 246 may be positioned relative to damage site 16D by contacting vane 16R along contact line 233 and quartz lamp fixture 242 may be positioned relative to damage site 16D by contacting adjacent vane 16A along contact line 235. Care is taken to not damage the vanes in the process of locating focused quartz lamp fixtures 242 and 246 on damaged vane 16R. Cavities 254 and 256 in focused quartz lamp fixtures 242 and 244 comprise axially extending minors that respectively focus high energy infrared radiation from tungsten wires (not shown) in focusing cavities 254 and 256 during operation. Quartz windows (not shown) protect the tungsten heating elements from oxidation during operation. Beam B depicts the line of site of infrared pyrometer 252 on damage site 16D to measure temperature of damage site 16D during an interdiffusion anneal. Feedback from infrared pyrometer 252 to a control system (not shown) monitors and controls the thermal program during the interdiffusion anneal.

A source of inert gas (not shown) floods the repair site and prevents oxidation of vane 16R and two adjacent vanes during interdiffusion. Argon gas is a preferred inert environment although other inert gases may be used.

An embodiment of the invention thermally treats only the damage site. By focusing the infrared energy to the immediate vicinity of the damage site in the process of the invention, adjacent vanes are unaffected during the thermal treatment.

Once heat treating fixture 240 is in position (Step 110), the interdiffusion anneal can proceed (Step 112). Temperatures of up to about 2000° F. (1093° C.) and times of up to 20 hours are preferred for interdiffusion anneal of both aluminide and MCrAlY coatings. In an embodiment of the invention, a low activity aluminide coating precursor treated at temperatures of about 1600° F. (871° C.) is preferred. For the low activity aluminide of the present invention, times of 1-10 hours are preferred but times of 1-4 hours are most preferred. Following the interdiffusion anneal, heat treating fixture 240 is removed from turbine module 10. Repair damage site 16D is cleaned to remove undiffused coating residue (Step 114) and, if other repairs are not needed, turbine module 10 is returned to service (Step 116).

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of repairing a damaged coated turbine engine component of a module assembly, the method comprising:

removing a damaged coating and underlying physical damage to the component to prepare a repair site, with the component mounted in the module assembly;

applying a diffusible coating precursor to the repair site with the component mounted in the module assembly;

mounting a heat treating fixture on the component at the repair site with the component mounted in the module assembly;

providing an infrared energy beam focused on the repair site such that adjacent components are not heated with the infrared energy beam;

heating the repair site according to a heating schedule;

controlling the heating schedule with a remote line of sight infrared pyrometer and control system to interdiffuse the coating precursor and the component with the component mounted in the module assembly; and cleaning the repair site with the component mounted in the module assembly.

2. The method of claim 1, wherein the damaged coating and underlying damage are removed by abrasive means.

3. The method of claim 1, wherein the damaged coating is removed by mechanical abrasion.

4. The method of claim 1, wherein the underlying physical damage to the component is removed by mechanical abrasion.

5. The method of claim 4, wherein the underlying physical damage is inspected following coating removal to assess the extent of subsurface cracking.

6. The method of claim 1, wherein the diffusible coating precursor is applied in the form of a slurry or tape.

7. The method of claim 6, wherein the slurry is applied by brushing or spraying.

8. The method of claim 1, wherein the turbine engine component is a vane.

9. The method of claim 8, wherein the heat treating fixture is positioned by physical contact on the vane to be repaired and an adjacent vane.

10. The method of claim 8, and further comprising:

determining that the vane is repairable if the cracks are found to be shallow enough wherein removal will not weaken the hollow vane wall.

11. The method of claim 1, wherein the focused infrared energy is supplied by high energy quartz lamps.

12. The method of claim 1, wherein the heat treating fixture provides an inert atmosphere to the damaged region throughout the heat treatment.

13. The method of claim 12, wherein the inert atmosphere comprises flowing argon gas.

14. The method of claim 1, wherein the diffusible coating precursor comprises an aluminide or MCrAlY precursor wherein M is selected from the group consisting of nickel, cobalt, iron, and combinations thereof.

15. The method of claim 14, wherein the diffusible coating precursor is a low activity aluminide coating precursor.

16. The method of claim 14, wherein the repair site is heated to a temperature of between 1000° F. and 2000° F. for a time of between 1 and 20 hours.

17. The method of claim 16, wherein the repair site is heated to a temperature of about 1600° F. for a time of between 1 and 4 hours.

18. A method of repairing a damaged region of a coated vane from a turbine module without removing the vane from the module, the method comprising:

identifying and qualifying the damaged region as suitable for in situ repair;

removing the damaged coating;

examining a superalloy substrate of the vane for cracks and other damage;

blending the damage by abrasion to remove the cracks;

applying a diffusible coating precursor to the damaged regions;

mounting a heating fixture on the vane;

heating the damaged region according to a heating schedule with focused high energy quartz lamps such that adjacent turbine components are unaffected by the heating;

controlling the heating schedule with a remote line of sight infrared pyrometer and control system to interdiffuse the coating precursor and the vane;

providing an inert atmosphere during interdiffusion of the coating and superalloy substrate;

cleaning the vane; and returning module to service.

* * * * *

UNITED STATES PATENT AND TRADEMARK OFFICE

CERTIFICATE OF CORRECTION

PATENT NO. : 8,505,201 B2
APPLICATION NO. : 13/184908
DATED : August 13, 2013
INVENTOR(S) : Thomas DeMichael et al.

It is certified that error appears in the above-identified patent and that said Letters Patent is hereby corrected as shown below:

In The Specification

Col. 3, Line 40
Delete "minors"
Insert --mirrors--

Signed and Sealed this
Nineteenth Day of May, 2015

Michelle K. Lee
*Director of the United States Patent and Trademark Office*